US011074019B2

(12) United States Patent
Akahira (10) Patent No.: US 11,074,019 B2
(45) Date of Patent: Jul. 27, 2021

(54) IMAGE FORMING APPARATUS HAVING A DETERMINATION UNIT FOR DETERMINING WHETHER A MOBILE TERMINAL IS APPROACHING

(71) Applicant: FUJIFILM BUSINESS INNOVATION CORP., Tokyo (JP)

(72) Inventor: Shinji Akahira, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 148 days.

(21) Appl. No.: 16/024,946

(22) Filed: Jul. 2, 2018

(65) Prior Publication Data
US 2019/0018621 A1  Jan. 17, 2019

(30) Foreign Application Priority Data

Jul. 12, 2017  (JP) .............................. JP2017-136143

(51) Int. Cl.
*G06F 3/12* (2006.01)
*H04W 4/02* (2018.01)
(Continued)

(52) U.S. Cl.
CPC .......... *G06F 3/1204* (2013.01); *G06F 3/1254* (2013.01); *G06F 3/1259* (2013.01); *H04W 4/023* (2013.01); *G06F 1/3231* (2013.01); *G06F 3/1292* (2013.01); *H04M 1/72412* (2021.01); *H04N 1/00485* (2013.01)

(58) Field of Classification Search
None
See application file for complete search history.

(56) References Cited

U.S. PATENT DOCUMENTS 9,207,884 B1 * 12/2015 Baratharajan ...... H04N 1/32117
2002/0089694 A1 * 7/2002 Idehara .................... H04N 1/00
358/1.15

(Continued)

FOREIGN PATENT DOCUMENTS

JP  2004-351863 A  12/2004
JP  2009-146361 A  7/2009
(Continued)

OTHER PUBLICATIONS

Apr. 27, 2021 Office Action issued in Japanese Patent Application No. 2017-136143.

*Primary Examiner* — Haris Sabah
(74) *Attorney, Agent, or Firm* — Oliff PLC (57) ABSTRACT

An image forming apparatus includes a detector, a reception unit, an output unit, and a controller. The detector detects a distance between the image forming apparatus and a mobile terminal apparatus that is located near the image forming apparatus. The reception unit receives printing data from a mobile terminal apparatus. The output unit outputs, when a specific operation is performed by a user, a printing result based on the printing data received by the reception unit. The controller controls, in a case where the printing data received by the reception unit is printing data from a mobile terminal apparatus for which the distance detected by the detector is within a preset range, the output unit to output the printing result without requiring the specific operation by the user.

10 Claims, 9 Drawing Sheets

(51) Int. Cl.
*H04M 1/72412* (2021.01)
*H04N 1/00* (2006.01)
*G06F 1/3231* (2019.01)

(56) References Cited

U.S. PATENT DOCUMENTS

| | | | |
|---|---|---|---|
| 2008/0170256 A1* | 7/2008 | Matsuhara | G06F 3/1288 |
| | | | 358/1.15 |
| 2009/0021783 A1* | 1/2009 | Hosokawa | G06F 3/1292 |
| | | | 358/1.15 |
| 2012/0243038 A1* | 9/2012 | Saeda | G06F 3/1267 |
| | | | 358/1.15 |
| 2014/0092431 A1* | 4/2014 | Okuno | G06F 3/1292 |
| | | | 358/1.15 |
| 2014/0168702 A1* | 6/2014 | Morita | G06F 21/645 |
| | | | 358/1.15 |
| 2016/0246554 A1* | 8/2016 | Yasuda | G06F 3/1204 |
| 2016/0381242 A1* | 12/2016 | Arakawa | H04N 1/00954 |
| | | | 358/1.14 |

FOREIGN PATENT DOCUMENTS

| | | |
|---|---|---|
| JP | 2011-041132 A | 2/2011 |
| JP | 2015-084126 A | 4/2015 |
| JP | 2016-015606 A | 1/2016 |
| JP | 2016-071704 A | 5/2016 |

\* cited by examiner

| MOBILE TERMINAL APPARATUS 10 | DISTANCE TO IMAGE FORMING APPARATUS 12 |
|---|---|
| 10a | 3 m |
| 10b | 2 m |
| 10c | 5 m |

FIG. 9

IMAGE FORMING APPARATUS HAVING A DETERMINATION UNIT FOR DETERMINING WHETHER A MOBILE TERMINAL IS APPROACHING

CROSS-REFERENCE TO RELATED APPLICATIONS

This application is based on and claims priority under 35 USC 119 from Japanese Patent Application No. 2017-136143 filed Jul. 12, 2017.

BACKGROUND

Technical Field

The present invention relates to an image forming apparatus and a non-transitory computer readable medium.

SUMMARY

According to an aspect of the invention, there is provided an image forming apparatus including a detector, a reception unit, an output unit, and a controller. The detector detects a distance between the image forming apparatus and a mobile terminal apparatus that is located near the image forming apparatus. The reception unit receives printing data from a mobile terminal apparatus. The output unit outputs, when a specific operation is performed by a user, a printing result based on the printing data received by the reception unit. The controller controls, in a case where the printing data received by the reception unit is printing data from a mobile terminal apparatus for which the distance detected by the detector is within a preset range, the output unit to output the printing result without requiring the specific operation by the user.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described in detail below with reference to drawings.

Figure 1:
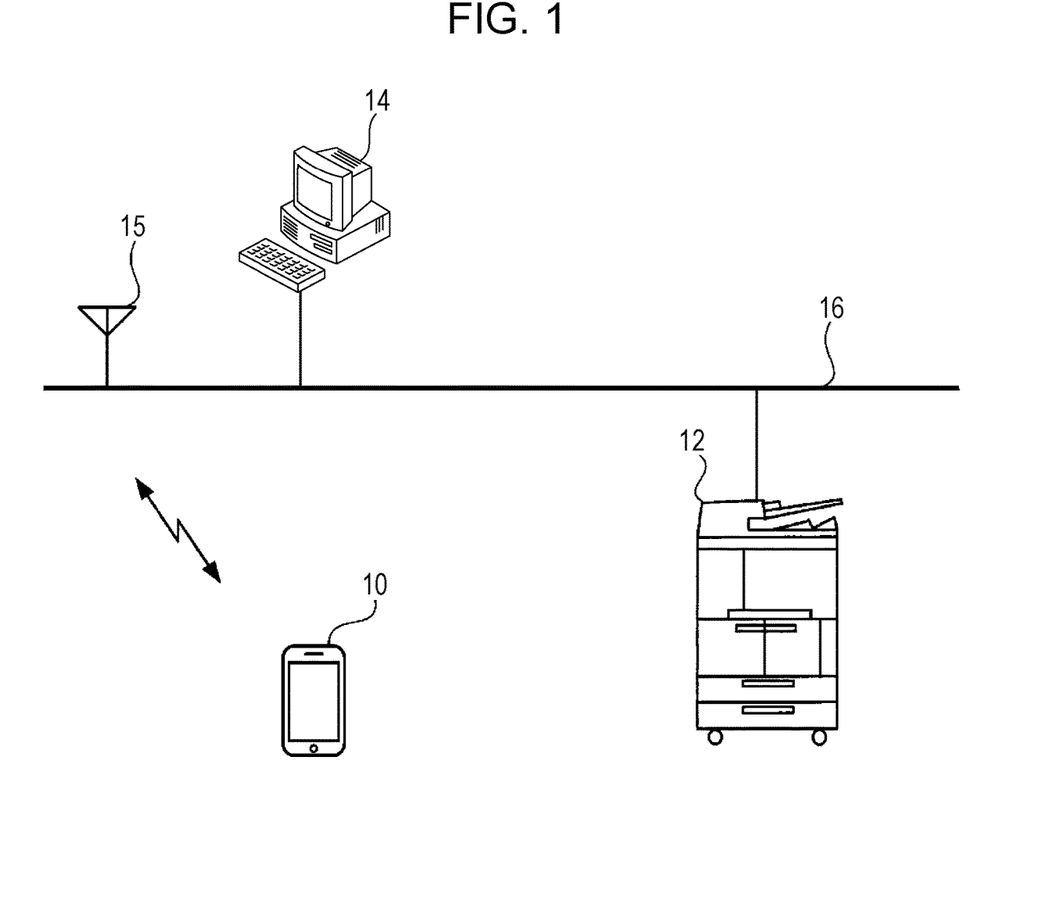
FIG. 1 is a system diagram illustrating a configuration of an image forming system according to an exemplary embodiment of the present invention.

FIG. 1 is a diagram illustrating a system configuration of an image forming system according to an exemplary embodiment of the present invention.

An image forming system according to an exemplary embodiment of the present invention includes, as illustrated in FIG. 1, a mobile terminal apparatus 10 that may be carried by a user, such as a smartphone or a tablet terminal apparatus, an image forming apparatus 12, and a terminal apparatus 14 such as a personal computer.

The mobile terminal apparatus 10 and the image forming apparatus 12 are connected to a network 16 via a wireless local area network (LAN) terminal 15, such as a Wi-Fi® router, to transmit and receive information.

Furthermore, the terminal apparatus 14 and the image forming apparatus 12 are connected to each other by the network 16 to transmit and receive information.

In the present invention, the mobile terminal apparatus 10 may be any type of terminal apparatus as long as the apparatus may be moved by being carried by a user and may be connected to the image forming apparatus 12 via a communication network. However, in this exemplary embodiment, a case where the mobile terminal apparatus 10 is a tablet terminal apparatus that is capable of transmitting printing data and includes a touch panel to which touch input may be performed will be described.

The mobile terminal apparatus 10 and the terminal apparatus 14 generate printing data and transmits the generated printing data to the image forming apparatus 12 via the network 16. The image forming apparatus 12 receives the printing data transmitted from the mobile terminal apparatus 10 and the terminal apparatus 14 and outputs images corresponding to the printing data to paper. The image forming apparatus 12 is an apparatus which is a so-called multifunction apparatus including multiple functions including a print function, a scan function, a copy function, a facsimile function, and so on.

Figure 2:
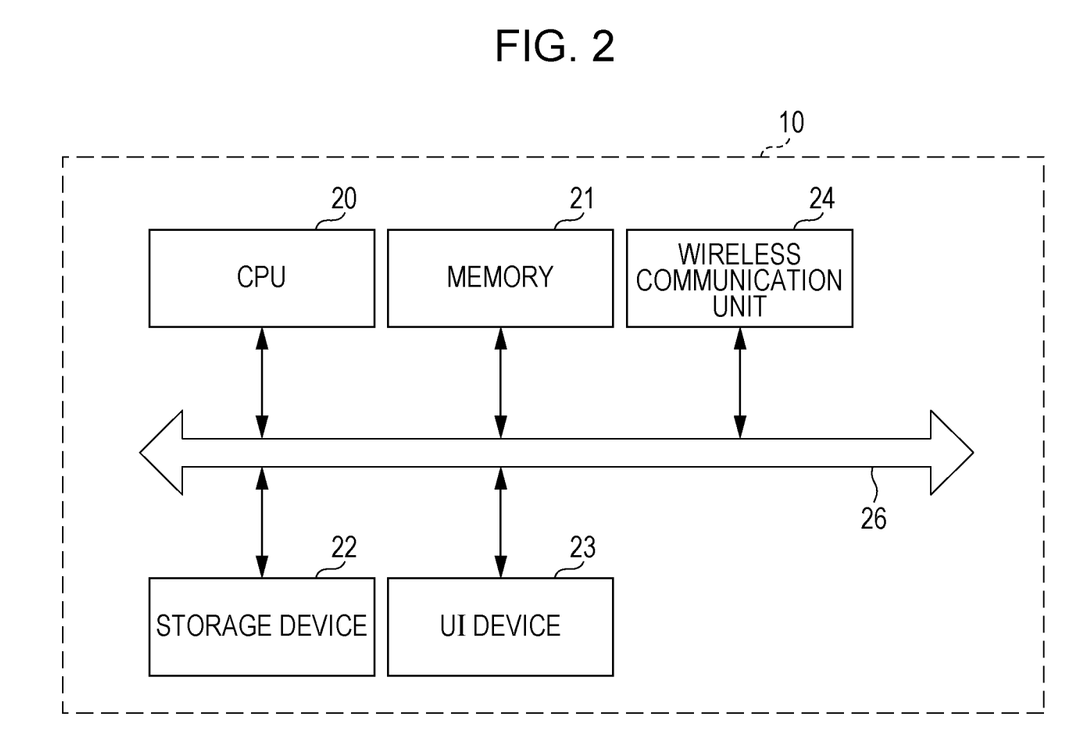
FIG. 2 is a block diagram illustrating a hardware configuration of a mobile terminal apparatus according to an exemplary embodiment of the present invention.

Next, a hardware configuration of the mobile terminal apparatus 10 in an image forming system according to an exemplary embodiment is illustrated in FIG. 2.

The mobile terminal apparatus 10 includes, as illustrated in FIG. 2, a central processing unit (CPU) 20, a memory 21 that may temporarily store data, a storage device 22 such as a flash memory, a user interface (UI) device 23 that includes a touch panel and press-button keys, and a wireless communication unit 24 that performs wireless communication with the wireless LAN terminal 15 to transmit and receive data. The above components are connected to one another via a control bus 26.

The CPU 20 performs predetermined processing based on a control program stored in the memory 21 or the storage device 22 to control an operation of the mobile terminal apparatus 10. In this exemplary embodiment, the CPU 20 is described as a unit that reads and executes the control program stored in the memory 21 or the storage device 22.

However, the program may be stored in a storing medium such as a compact disc-read only memory (CD-ROM) and supplied to the CPU 20.

The wireless communication unit 24 performs wireless communication with the image forming apparatus 12 to transmit and receive individual terminal information and transmit and receive data. A wireless communication apparatus that supports Wi-Fi, a short-range wireless communication apparatus that supports Bluetooth®, or the like may be used as the wireless communication unit 24.

Figure 3:
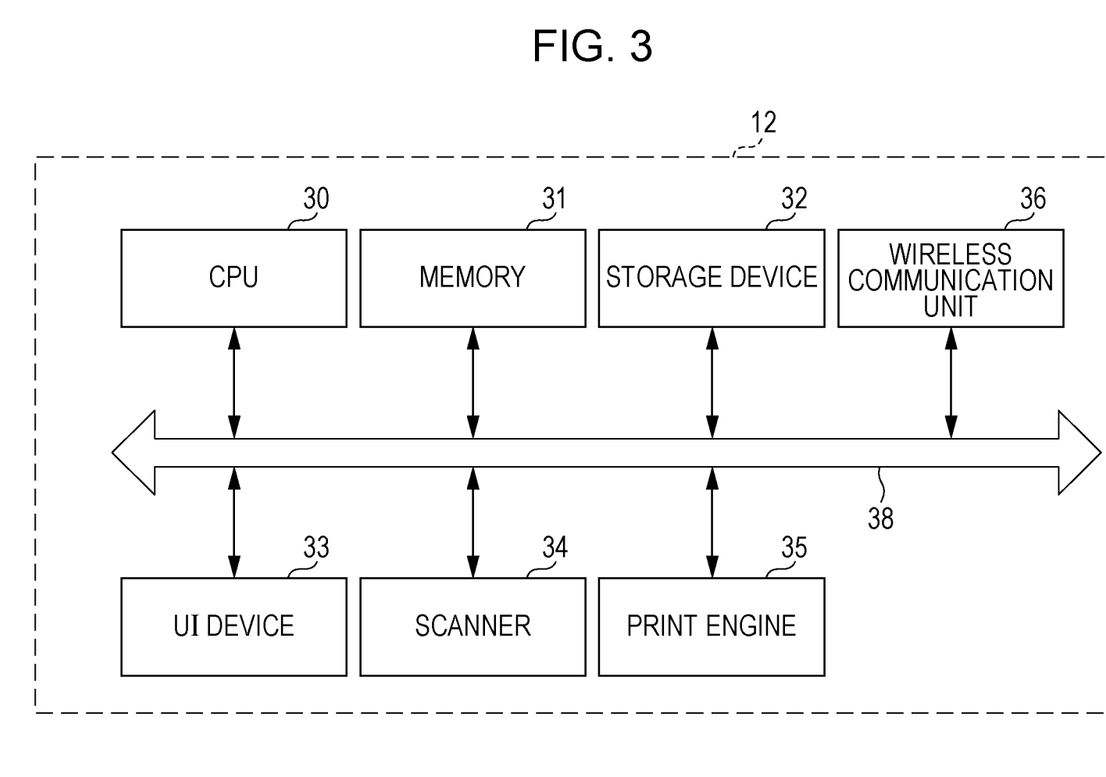
FIG. 3 is a block diagram illustrating a hardware configuration of an image forming apparatus according to an exemplary embodiment of the present invention.

Next, a hardware configuration of the image forming apparatus 12 in the image forming system according to this exemplary embodiment is illustrated in FIG. 3.

The image forming apparatus 12 includes, as illustrated in FIG. 3, a CPU 30, a memory 31 that may temporarily store data, a storage device 32 such as a hard disk drive (HDD), a UI device 33 that includes a touch panel or a liquid crystal display and a keyboard, a scanner 34, a print engine 35, and a wireless communication unit 36 that transmits and receives data to and from an eternal apparatus or the like via the network 16. The above components are connected to one another via a control bus 38.

The print engine 35 prints images on a recording medium such as printing paper after processes including charging, exposure, development, transfer, fixation, and the like.

The CPU 30 performs predetermined processing based on a control program stored in the memory 31 or the storage device 32 to control an operation of the image forming apparatus 12. In this exemplary embodiment, the CPU 30 is described as a unit that reads and executes the control program stored in the memory 31 or the storage device 32. However, the program may be stored in a storing medium such as a CD-ROM and supplied to the CPU 30.

The wireless communication unit 36 performs wireless communication with the mobile terminal apparatus 10 to transmit and receive individual terminal information and transmit and receive data. A wireless communication apparatus that supports Wi-Fi, a short-range wireless communication apparatus that supports Bluetooth, or the like may be used as the wireless communication unit 36.

The storage device 32 stores a high-order control program, stores (accumulates) printing data received via the wireless communication unit 36, and stores histories of the distance between the image forming apparatus 12 and the mobile terminal apparatus 10 detected by receiving the radio wave intensity of the mobile terminal apparatus 10 via the wireless communication unit 36.

Figure 4:
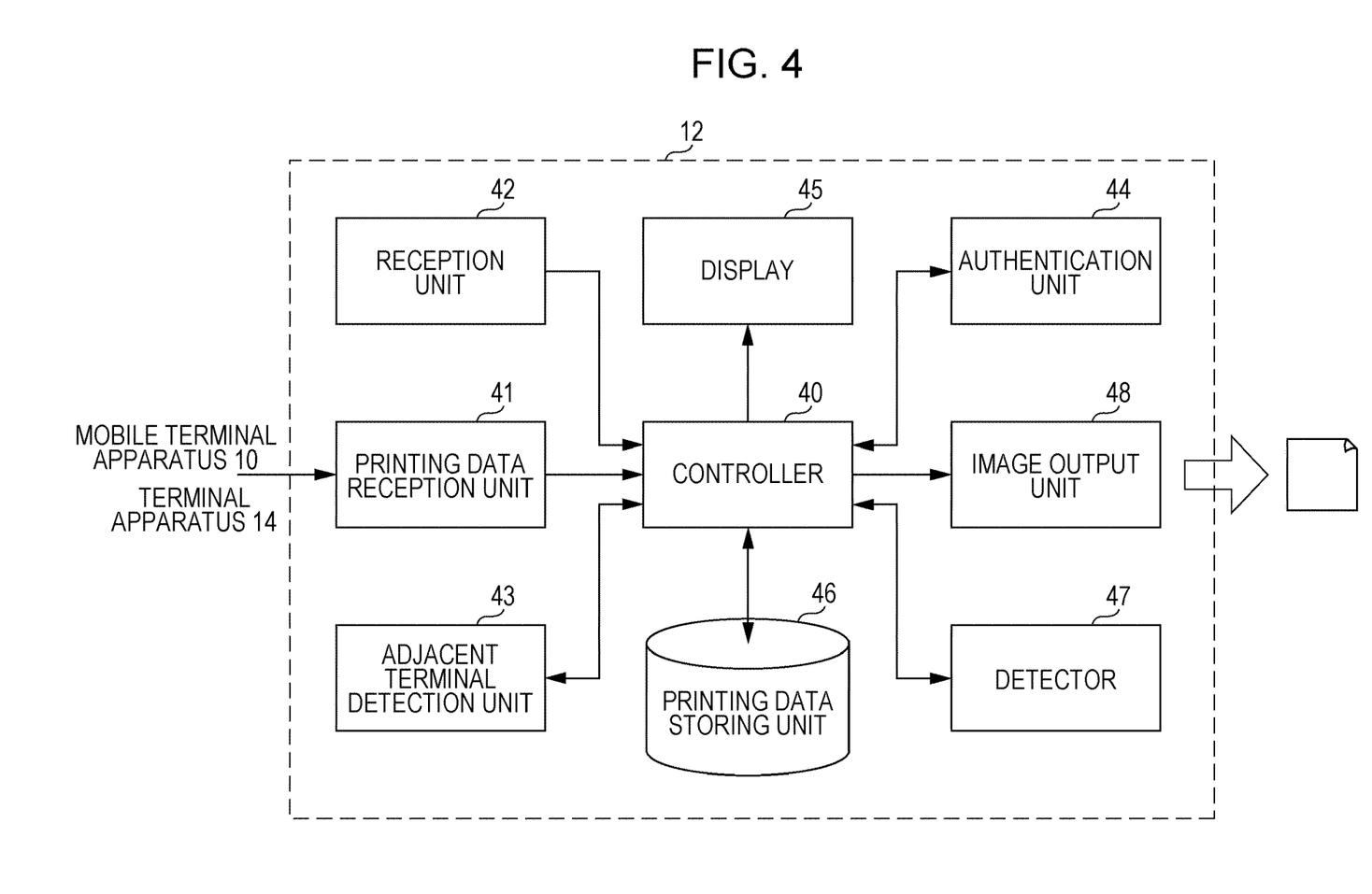
FIG. 4 is a diagram illustrating a functional configuration of an image forming apparatus according to an exemplary embodiment of the present invention.

FIG. 4 is a block diagram illustrating a functional configuration of the image forming apparatus 12 implemented when the above-mentioned control program is executed.

The image forming apparatus 12 according to this exemplary embodiment includes, as illustrated in FIG. 4, a controller 40, a printing data reception unit 41, a reception unit 42, an adjacent terminal detection unit 43, an authentication unit 44, a display 45, a printing data storing unit 46, a detector 47, and an image output unit 48.

The reception unit 42 receives an operation for the image forming apparatus 12 on the display screen of the UI device 33.

The display 45 displays and presents to a user an operation result, a processing result, and the like for the image forming apparatus 12 on the display screen of the UI device 33.

The printing data reception unit 41 receives printing data transmitted from the mobile terminal apparatus 10 and the terminal apparatus 14.

The authentication unit 44 authenticates a user who uses the image forming apparatus 12, on the basis of an input user ID and password.

The printing data storing unit 46 temporarily stores printing data received by the printing data reception unit 41. Furthermore, the printing data storing unit 46 functions as an accumulation unit that accumulates printing data received by the printing data reception unit 41, and temporarily stores and accumulates printing data of accumulation printing such as security printing, private printing, and the like.

Printing data of accumulation printing represents printing data for which printing is not executed immediately when the printing data reception unit 41 receives the printing data and is executed when a preset condition is satisfied after the printing data is stored in the printing data storing unit 46.

Furthermore, printing data of security printing represents printing data which is set for each user in a desired manner and for which printing is executed when authentication of a user is performed and an instruction for output is issued by the authentication unit 44 after the printing data is stored in the printing data storing unit 46. Printing data of private printing represents printing data which is set for each image forming apparatus and for which printing is executed when authentication of a user is performed and an instruction for output is issued by the authentication unit 44 after the printing data is stored in the printing data storing unit 46.

The adjacent terminal detection unit 43 detects, every several seconds, the intensity of radio waves of a wireless LAN such as Bluetooth or Wi-Fi emitted by the mobile terminal apparatus 10 and detects the mobile terminal apparatus 10 that is located within a preset range from the image forming apparatus 12. Then, the adjacent terminal detection unit 43 calculates and detects the distance between the image forming apparatus 12 and the mobile terminal apparatus 10, based on the detected radio wave intensity. Thus, the adjacent terminal detection unit 43 detects the mobile terminal apparatus 10 that is located within an adjacent range, for example, less than 5 meters away from the image forming apparatus 12, which is a preset range near the image forming apparatus 12.

The controller 40 determines, based on histories (changes of the radio wave intensity) of the distance between the image forming apparatus 12 and the mobile terminal apparatus 10 stored in the storage device 32, whether or not the mobile terminal apparatus 10 that is located within the adjacent range is approaching the image forming apparatus 12.

The detector 47 includes a tray detection unit that detects whether or not a printing result is present on a paper output tray and a user detection unit that detects whether or not a person is present near the image forming apparatus 12.

When a specific operation is performed by a user, the image output unit 48 outputs a printing result, based on printing data received by the printing data reception unit 41. Furthermore, the image output unit 48 outputs a printing result, based on printing data for which an output instruction operation is performed by a user, from among plural pieces of printing data stored in the printing data storing unit 46.

That is, in the case where printing data received by the printing data reception unit 41 is printing data from the mobile terminal apparatus 10 for which the distance detected by the adjacent terminal detection unit 43 is within the preset range, the controller 40 controls the image output unit 48 to output a printing result, without requiring a specific operation by a user.

Furthermore, in the case where printing data received by the printing data reception unit 41 is printing data from the mobile terminal apparatus 10 for which the distance detected by the adjacent terminal detection unit 43 is within the preset range, the controller 40 controls the image output unit 48 to output a printing result based on the printing data, without causing the printing data storing unit 46 to store (accumulate) the printing data.

Furthermore, in the case where printing data received by the printing data reception unit 41 is not printing data from the mobile terminal apparatus 10 for which the distance detected by the adjacent terminal detection unit 43 is within the preset range, the controller 40 controls the printing data storing unit 46 to store (accumulate) the printing data.

Furthermore, even in the case where printing data received by the printing data reception unit 41 is printing data from the mobile terminal apparatus 10 for which the distance detected by the adjacent terminal detection unit 43 is within the preset range, the controller 40 controls the printing data storing unit 46 to store (accumulate) the printing data, without causing the image output unit 48 to output a printing result based on the printing data, according to use conditions of a different user.

Specifically, in the case where the detector 47 detects that a printing result of a different user is left on the paper output tray, the controller 40 controls the printing data storing unit 46 to store (accumulate) printing data received by the printing data reception unit 41, without causing the image output unit 48 to output a printing result based on the printing data.

Furthermore, in the case where a preset time has not passed since completion of output of a printing result based on printing data of a different user, the controller 40 controls the printing data storing unit 46 to store (accumulate) printing data received by the printing data reception unit 41, without causing the image output unit 48 to output a printing result based on the printing data.

Furthermore, in the case where the detector 47 detects that a different user is present near the image forming apparatus 12, the controller 40 controls the printing data storing unit 46 to store (accumulate) printing data received by the printing data reception unit 41, without causing the image output unit 48 to output a printing result based on the printing data.

Furthermore, even in the case where printing data received by the printing data reception unit 41 is printing data from the mobile terminal apparatus 10 for which the distance detected by the adjacent terminal detection unit 43 is within the preset range, when it is determined that the mobile terminal apparatus 10 is not approaching the image forming apparatus 12, the controller 40 controls the printing data storing unit 46 to store (accumulate) the printing data, without causing the image output unit 48 to output a printing result based on the printing data.

Furthermore, even in the case where printing data received by the printing data reception unit 41 is printing data from the mobile terminal apparatus 10 for which the distance detected by the adjacent terminal detection unit 43 is within the preset range, when it is determined, after the image output unit 48 starts to output a printing result based on the printing data, that the mobile terminal apparatus 10 is not approaching the image forming apparatus 12, the controller 40 transmits alert information to the mobile terminal apparatus 10.

Figure 5:
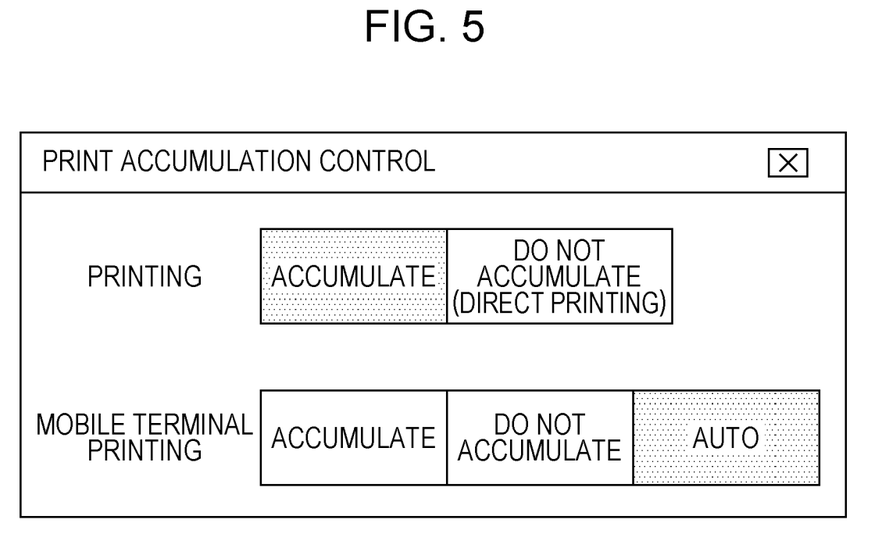
FIG. 5 is a diagram illustrating an example of a display screen of an image forming apparatus according to an exemplary embodiment of the present invention.

FIG. 5 is a diagram illustrating a print accumulation control screen, as an example of a display screen of the UI device 33 of the image forming apparatus 12.

A user or a machine administrator is able to perform setting on the display screen of the UI device 33, regarding print accumulation control of the image forming apparatus 12, by selecting for printing data received from the terminal apparatus 14 (printing) between "accumulate" and "do not accumulate (direct printing)" and for printing data received from the mobile terminal apparatus 10 (mobile terminal printing) among "accumulate", "do not accumulate", and "auto".

"Auto" setting of mobile terminal printing represents setting for accumulation printing in which printing data from the mobile terminal apparatus 10 which is located within an adjacent range near the image forming apparatus 12 and which is approaching the image forming apparatus 12 is printed without being accumulated in the printing data storing unit 46 (direct printing) in a case where there is a low possibility that the contents of a printing result may be known by a different user, such as a case where the a different user does not use the image forming apparatus 12, no person is present near the image forming apparatus 12, or a preset time has passed since completion of output of a printing result based on printing data for a different user, and even printing data from the image forming apparatus 12 which is located within the adjacent range near the image forming apparatus 12 and which is approaching the image forming apparatus 12 is stored and accumulated in the printing data storing unit 46 in the case where there is a possibility that the contents of a printing result may be known by a different user, such as a case where a different user uses the image forming apparatus 12, a person is present near the image forming apparatus 12, the preset time has not passed since completion of output of a printing result based on printing data of a different user.

Figure 6:
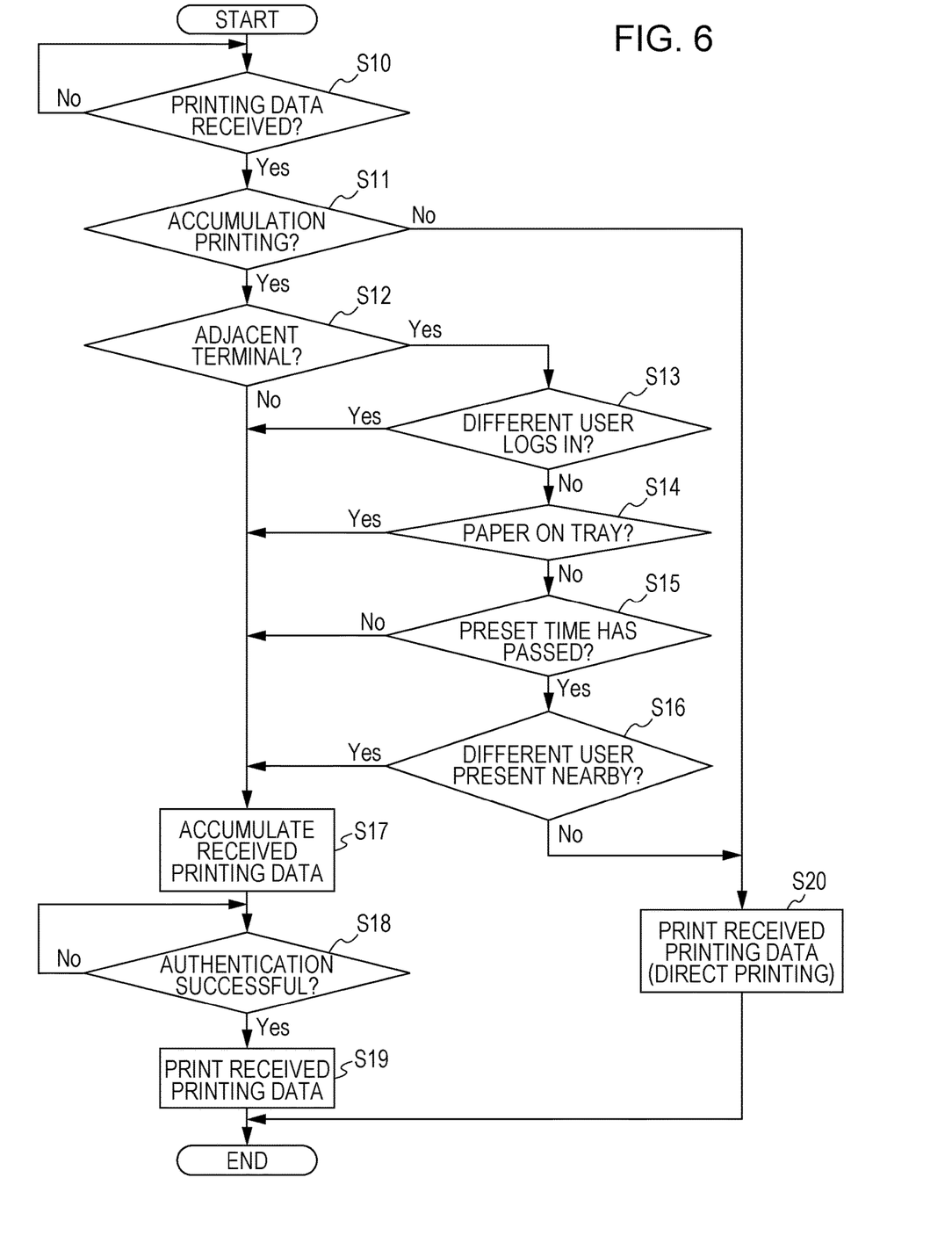
FIG. 6 is a flowchart illustrating an operation of an image forming apparatus according to an exemplary embodiment of the present invention.

FIG. 6 is a flowchart illustrating an operation of the image forming apparatus 12. A case where the image forming apparatus 12 receives printing data from a mobile terminal apparatus 10a will be described as an example.

First, when the printing data reception unit 41 receives printing data from the mobile terminal apparatus 10a (step S10), it is determined whether or not the above-described setting for mobile terminal printing is set to "accumulate" or "auto" accumulation printing (step S11).

In the case where accumulation printing is not set (No in step S11), the controller 40 controls the image output unit 48 to print the received printing data without accumulating the printing data (direct printing) (step S20).

In the case where accumulation printing is set (Yes in step S11), it is determined whether or not the mobile terminal apparatus 10a is an adjacent terminal which is located within an adjacent range near the image forming apparatus 12 and approaching the image forming apparatus 12 (step S12).

Figure 7:
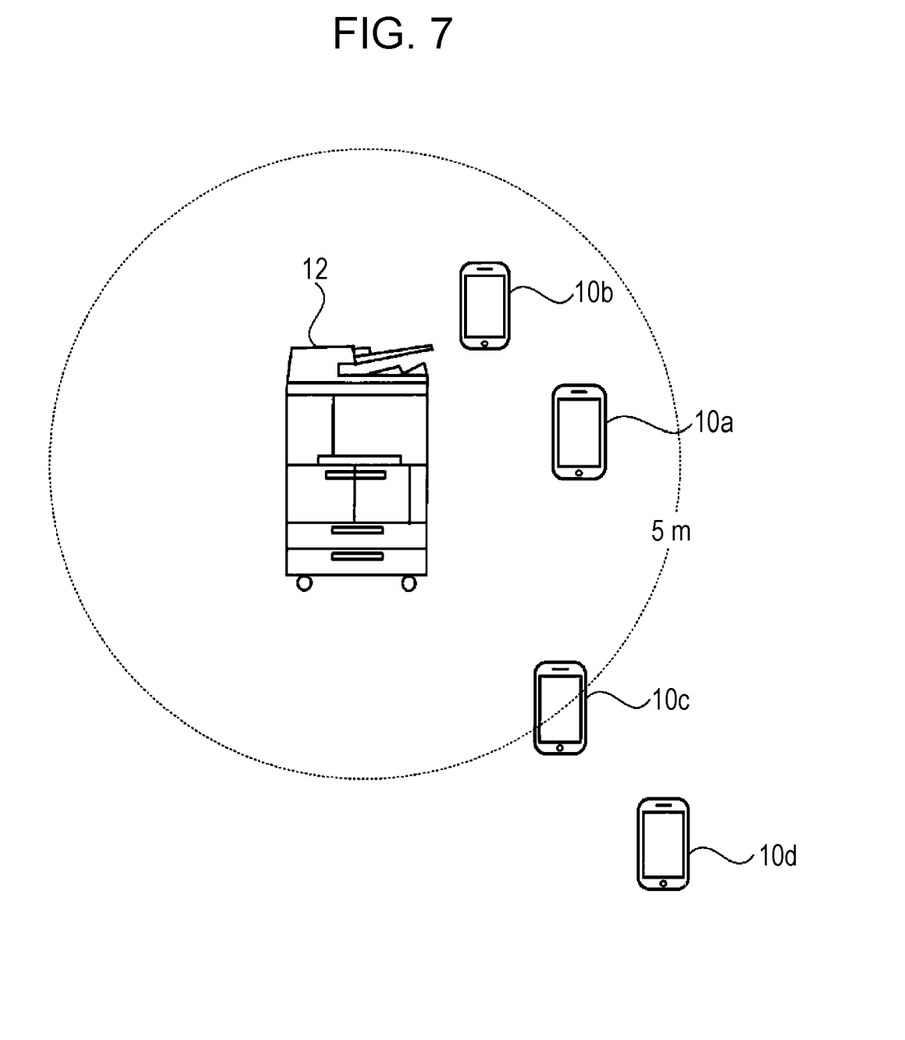
FIG. 7 is a diagram for explaining the relationship of an image forming apparatus and mobile terminal apparatuses in an exemplary embodiment of the present invention.

Specifically, the adjacent terminal detection unit 43 detects, every several seconds, the intensity of radio waves emitted by the mobile terminal apparatus 10 and detects, for example, as illustrated in FIG. 7, the mobile terminal apparatuses 10a, 10b, and 10c that are located within a preset range from the image forming apparatus 12. Then, the distance between the image forming apparatus 12 and each of the mobile terminal apparatuses 10a to 10c is calculated, based on the detected radio wave intensity. Thus, the mobile terminal apparatuses 10a, 10b, and 10c that are located within an adjacent range, for example, less than 5 meters away from the image forming apparatus 12, which is the preset range near the image forming apparatus 12, are detected. Then, histories of the distance between the image forming apparatus 12 and the mobile terminal apparatuses 10a, 10b, and 10c that are located within the adjacent range are recorded in the storage device 32. Then, the controller 40 determines, based on the histories of the distance between the image forming apparatus 12 and the mobile terminal apparatuses 10a to 10c stored in the storage device 32 (changes in the radio wave intensity), whether or not the mobile terminal apparatus 10 that is located in within the adjacent range is an adjacent terminal approaching the image forming apparatus 12.

Figure 8A:
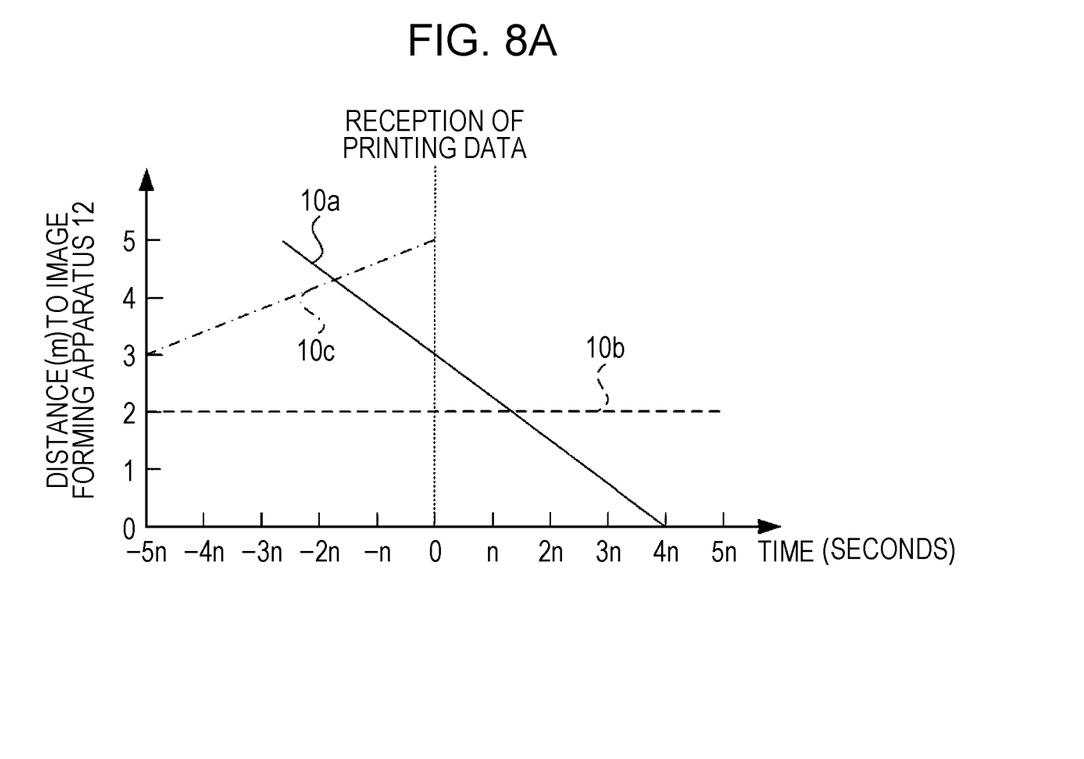
FIG. 8A is a diagram illustrating histories of movement of mobile terminal apparatuses present near an image forming apparatus before and after the image forming apparatus receives printing data from a mobile terminal apparatus.
Figure 8B:
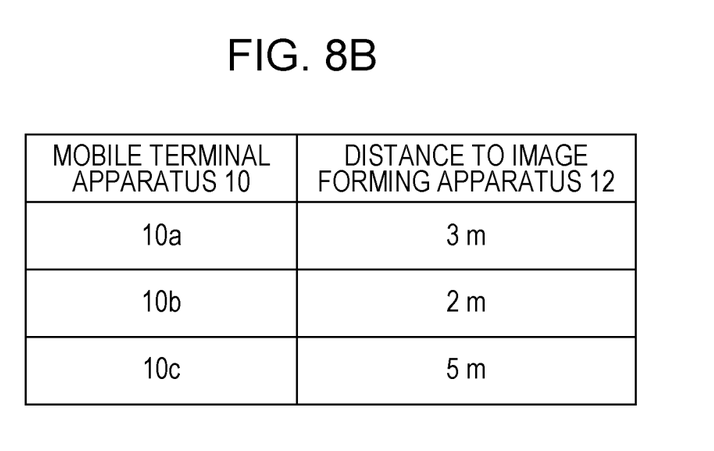
FIG. 8B is a diagram illustrating an example of adjacent range terminal registration information detected by the image forming apparatus when the image forming apparatus receives the printing data.

FIG. 8A is a diagram illustrating histories of movement of the mobile terminal apparatuses 10a to 10c that are located within the adjacent range near the image forming apparatus 12 before and after printing data is received from the mobile terminal apparatus 10a. FIG. 8B is a diagram illustrating an example of adjacent range terminal registration information detected by the image forming apparatus 12 at the time when printing data is received.

When printing data is received from the mobile terminal apparatus 10a, the adjacent terminal detection unit 43 causes the printing data storing unit 46 to accumulate the received printing data in the case where adjacent information of the mobile terminal apparatus 10a at the time when the printing data is received indicates that the mobile terminal apparatus 10a does not approach the image forming apparatus 12 compared to m pieces of information, which are past histories, and the adjacent terminal detection unit 43 prints the printing data without accumulating the printing data into the printing data storing unit 46 in the case where the adjacent information indicates that the mobile terminal apparatus 10 is approaching the image forming apparatus 12.

That is, as illustrated in FIG. 8B, at the time when the image forming apparatus 12 receives the printing data from the mobile terminal apparatus 10a, the mobile terminal apparatus 10b is closer to the image forming apparatus 12 than the mobile terminal apparatus 10a is. However, as illustrated in FIG. 8A, the distance between the image forming apparatus 12 and the mobile terminal apparatus 10b at the time when the printing data is received is the same as the distance between the image forming apparatus 12 and the mobile terminal apparatus 10b at a time before the printing data is received, and it is thus estimated that the mobile terminal apparatus 10b maintains the same distance from the image forming apparatus 12. Furthermore, the distance between the image forming apparatus 12 and the mobile terminal apparatus 10c at a time before the printing data is received is shorter than the distance between the image forming apparatus 12 and the mobile terminal apparatus 10c at the time when the printing data is received, and it is thus estimated that the mobile terminal apparatus 10c is not approaching but moving away from the image forming apparatus 12 compared to the time before the printing data is received. In contrast, the distance between the image forming apparatus 12 and the mobile terminal apparatus 10a at a time before the printing data is received is longer than the distance between the image forming apparatus 12 and the mobile terminal apparatus 10a at the time when the printing data is received, and it is thus estimated that the mobile terminal apparatus 10a is approaching the image forming apparatus 12 compared to the time before the printing data is received.

That is, it is determined that the mobile terminal apparatus 10b and the mobile terminal apparatus 10c that are located within the adjacent range are not approaching the image forming apparatus 12, and it is determined that the mobile terminal apparatus 10a that is located within the adjacent range is an adjacent terminal approaching the image forming apparatus 12.

Then, in the case where it is determined that the received printing data is received from the adjacent terminal that is located within the adjacent range and approaching the image forming apparatus 12 (Yes in step S12), the controller 40 determines, based on conditions of a different user, whether or not there is a possibility that the contents of a printing result may be known by the different user (steps S13 to S16). That is, in the case where it is determined, according to use conditions of a different user, that there is a possibility that the contents of the printing result may be known by the different user, the received printing data is stored and accumulated into the printing data storing unit 46.

Specifically, it is determined whether or not a different user logs into the image forming apparatus 12 (step S13). In the case where it is determined that a different user logs in (Yes in step S13), the received printing data is accumulated in the printing data storing unit 46 (step S17).

In the case where it is determined that no different user logs into the image forming apparatus 12 (No in step S13), the detector 47 determines whether or not a printing result of a different user is left on the paper output tray (step S14).

In the case where it is determined that a printing result of a different user is left on the paper output tray (Yes in step S14), the received printing data is accumulated into the printing data storing unit 46 (step S17).

In the case where it is determined that a printing result of a different user is not left on the paper output tray (No in step S14), it is determined whether or not the preset time has passed since completion of output of a printing result based on printing data of a different user (step S15).

In the case where it is determined that the preset time has not passed since completion of output of a printing result based on printing data of a different user (No in step S15), the received printing data is accumulated into the printing data storing unit 46 (step S17).

In the case where it is determined that the preset time has passed since completion of output of a printing result based on printing data of a different user (Yes in step S15), it is determined whether or not a different user (person) is present within the adjacent range near the image forming apparatus 12 (step S16).

In the case where it is determined that a different user is present near the image forming apparatus 12 (Yes in step S16), the received printing data is accumulated into the printing data storing unit 46 (step S17).

In the case where it is determined that no different user is present near the image forming apparatus 12 (No in step S16), the controller 40 controls the image output unit 48 to print the received printing data without accumulating the printing data (direct printing) (step S20).

That is, in the case where the received printing data is received from the mobile terminal apparatus 10a as an adjacent terminal and it is determined, based on conditions of a different user, that there is a low possibility that the contents of a printing result may be known by the different user (No in steps S13, S14, and S16 and Yes in step S15), the image output unit 48 is controlled to ignore accumulation setting on the image forming apparatus 12 side or an accumulation instruction on the mobile terminal apparatus 10 side and to output the printing result without accumulating the printing data into the printing data storing unit 46 and without requiring a specific operation by a user (direct printing) (step S20). Accordingly, a user operation is omitted, and the printing result may thus be acquired quickly compared to the case where the printing data is accumulated in the printing data storing unit 46 and then output. Furthermore, information leakage caused by leaving a printed material, loss of a printing result by mix-up, and the like may be avoided, and security of a printing result may thus be guaranteed.

Even in the case where the received printing data is received from the mobile terminal apparatus 10a as an adjacent terminal, when it is determined, according to conditions of a different user, that there is a possibility that the contents of a printing result may be known by the different user (Yes in step S13, S14, or S16 or No in step S15), the printing data is stored and accumulated into the printing data storing unit 46 without causing the image output unit 48 to output the printing result based on the printing data (S17).

Figure 9:
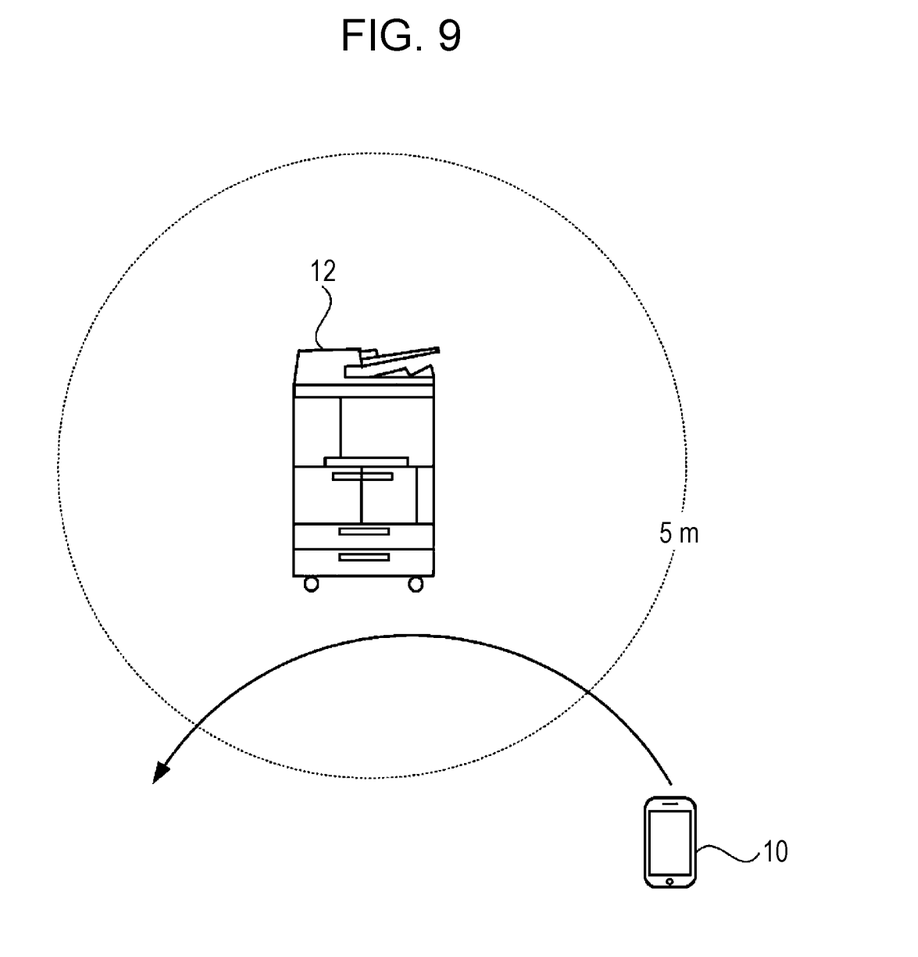
FIG. 9 is a diagram for explaining the relationship of an image forming apparatus and a mobile terminal apparatus according to an exemplary embodiment of the present invention.

Furthermore, even in the case where a mobile terminal apparatus is an adjacent terminal at the time when the mobile terminal apparatus receives printing data, the mobile terminal apparatus may move away from the image forming apparatus 12 after receiving the printing data, as illustrated in FIG. 9. As described above, in the case where it is determined, after the image output unit 48 starts to output the printing result based on the printing data, that the mobile terminal apparatus is not approaching the image forming apparatus 12, risks in terms of security such as information leakage caused by leaving of a printed material, loss of a printing result by mix-up, and the like are notified by transmitting alert information, such as displaying alert on the UI device 23 of the mobile terminal apparatus 10 or producing a warning sound, and prompting a user to quickly collect the printing result. At this time, selection between continuation of printing and accumulation by stopping printing may be performed on the screen of the UI device 23 of the mobile terminal apparatus 10.

As with a mobile terminal apparatus 10d illustrated in FIG. 7, in the case where it is determined that the printing data received by the printing data reception unit 41 is not printing data from an adjacent terminal that is located in the adjacent range for which the distance between the mobile terminal apparatus and the image forming apparatus 12 is within the preset range (No in step S12), the controller 40 performs control such that the received printing data is stored (accumulated) into the printing data storing unit 46 by ignoring setting on the image forming apparatus 12 side or setting on the mobile terminal apparatus 10d side (step S17). Then, accumulation is performed until a clear printing instruction such as authentication is performed by the authentication unit 44.

When the authentication unit 44 performs authentication using authentication information (step S18), the controller 40 controls the image output unit 48 to print the printing data accumulated in the printing data storing unit 46 (step S19).

In this exemplary embodiment, a configuration in which the intensity of radio waves of a wireless LAN emitted by the mobile terminal apparatus 10 is detected and the distance between the image forming apparatus 12 and the mobile terminal apparatus 10 is detected is described. However, the present invention is not limited to this. Signals from a global positioning system (GPS) satellite may be received so that positional information is acquired, or an adjacent terminal approaching the image forming apparatus 12 may be detected using infrared rays or the like.

Furthermore, in this exemplary embodiment, a configuration in which accumulation control setting is performed at the image forming apparatus 12 is described. However, the present invention is not limited to this. The present invention is also applicable to a case where accumulation printing setting is performed on the mobile terminal apparatus 10 side.

In this exemplary embodiment, a configuration in which the image forming apparatus 12 detects the intensity of radio waves of a wireless LAN emitted by the mobile terminal apparatus 10 and thus detects an adjacent terminal is described. However, the present invention is not limited to this. The mobile terminal apparatus 10 may detect that the mobile terminal apparatus 10 is approaching the image forming apparatus 12, change accumulation printing setting according to the approaching state, and transmit the changed accumulation printing setting to the image forming apparatus 12.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a detector that detects a distance between the image forming apparatus and a mobile terminal apparatus that is located near the image forming apparatus;
   a reception unit that receives printing data from the mobile terminal apparatus;
   an output unit that outputs, when a specific operation is performed by a user, a printing result based on the printing data received by the reception unit;
   a controller that controls, in a case where the printing data received by the reception unit is printing data from the mobile terminal apparatus for which the distance detected by the detector is within a preset range, the output unit to output the printing result without requiring the specific operation by the user;
   an accumulation unit that accumulates the printing data received by the reception unit;
   a memory that stores histories of a distance between the image forming apparatus and the mobile terminal apparatus, the distance being detected by the detector; and
   a determination unit that determines, based on the histories of the distance stored in the memory, whether or not the mobile terminal apparatus is approaching the image forming apparatus by determining a relative position of the mobile terminal apparatus with respect to another mobile terminal apparatus at a time point before the printing data is received and at a time point when the printing data is received,
   wherein the output unit outputs the printing result based on the printing data for which an output instruction operation is performed by the user, from among a plurality of pieces of printing data accumulated in the accumulation unit,
   wherein the output unit outputs the printing result when the mobile terminal apparatus is determined to be approaching the image forming apparatus even when the another mobile terminal apparatus is within a predetermined adjacent range of the image forming apparatus, and
   wherein even in a case where the printing data received by the reception unit is printing data from the mobile terminal apparatus for which the distance detected by the detector is within the preset range, when the determination unit determines that the mobile terminal apparatus is not approaching the image forming apparatus, the controller causes the accumulation unit to accumulate the printing data without causing the output unit to output the printing result based on the printing data.

2. The image forming apparatus according to claim 1, wherein in a case where the printing data received by the reception unit is printing data from the mobile terminal apparatus for which the distance detected by the detector is within the preset range, the controller controls the output unit to output the printing result based on the printing data without causing the accumulation unit to accumulate the printing data.

3. The image forming apparatus according to claim 1, wherein in a case where the printing data received by the reception unit is not the printing data from the mobile terminal apparatus for which the distance detected by the detector is within the preset range, the controller causes the accumulation unit to accumulate the printing data.

4. The image forming apparatus according to claim 1, wherein even in a case where the printing data received by the reception unit is the printing data from the mobile terminal apparatus for which the distance detected by the detector is within the preset range, the controller causes the accumulation unit to accumulate the printing data without causing the output unit to output the printing result based on the printing data, according to a use condition of a different user.

5. The image forming apparatus according to claim 4, further comprising:
   a tray detection unit that detects whether or not the printing result is present on a paper output tray,
   wherein in a case where the tray detection unit detects that the printing result of a different user is left on the paper output tray, the controller causes the accumulation unit to accumulate the printing data received by the reception unit without causing the output unit to output the printing result based on the printing data.

6. The image forming apparatus according to claim 4, wherein in a case where a preset time has not passed since completion of output of the printing result based on printing data of the different user, the controller causes the accumulation unit to accumulate the printing data received by the reception unit without causing the output unit to output the printing result based on the printing data received by the reception unit.

7. The image forming apparatus according to claim 4, further comprising:
   a user detection unit that detects whether the user is present near the image forming apparatus,
   wherein in a case where the user detection unit detects that the different user is present near the image forming apparatus, the controller causes the accumulation unit to accumulate the printing data received by the reception unit without causing the output unit to output the printing result based on the printing data.

8. The image forming apparatus according to claim 1, wherein the detector detects the distance between the image forming apparatus and the mobile terminal apparatus, based on an intensity of radio waves in wireless communication between the image forming apparatus and the mobile terminal apparatus.

9. An image forming apparatus comprising:
   a detector that detects a distance between the image forming apparatus and a mobile terminal apparatus that is located near the image forming apparatus;
   a reception unit that receives printing data from the mobile terminal apparatus;
   an output unit that outputs, when a specific operation is performed by a user, a printing result based on the printing data received by the reception unit;
   a controller that controls, in a case where the printing data received by the reception unit is printing data from the mobile terminal apparatus for which the distance detected by the detector is within a preset range, the output unit to output the printing result without requiring the specific operation by the user;
   an accumulation unit that accumulates the printing data received by the reception unit;
   a memory that stores histories of a distance between the image forming apparatus and the mobile terminal apparatus, the distance being detected by the detector; and
   a determination unit that determines, based on the histories of the distance stored in the memory, whether or not the mobile terminal apparatus is approaching the image forming apparatus by determining a relative position of the mobile terminal apparatus with respect to another mobile terminal apparatus at a time point before the printing data is received and at a time point when the printing data is received,
   wherein the output unit outputs the printing result based on the printing data for which an output instruction operation is performed by the user, from among a plurality of pieces of printing data accumulated in the accumulation unit,
   wherein the output unit outputs the printing result when the mobile terminal apparatus is determined to be approaching the image forming apparatus even when the another mobile terminal apparatus is within a predetermined adjacent range of the image forming apparatus, and
   wherein even in a case where the printing data received by the reception unit is printing data from the mobile terminal apparatus for which the distance detected by the detector is within the preset range, when the determination unit determines, after the output unit starts to output the printing result based on the printing data, that the mobile terminal apparatus is not approaching the image forming apparatus, the controller transmits alert information to the mobile terminal apparatus.

10. A non-transitory computer readable medium storing a program causing a computer to execute a process for image forming, the process comprising:
   detecting a distance between an image forming apparatus and a mobile terminal apparatus that is located near the image forming apparatus;
   receiving printing data from a mobile terminal apparatus;
   outputting, when a specific operation is performed by a user, a printing result based on the received printing data;
   performing, in a case where the received printing data is printing data from the mobile terminal apparatus for which the detected distance is within a preset range, control such that the printing result is output without requiring the specific operation by the user;
   accumulating the received printing data;
   storing, in a memory, histories of a distance between the image forming apparatus and the mobile terminal apparatus, the distance being detected by the detecting; and
   determining, based on the histories of the distance stored in the memory, whether or not the mobile terminal apparatus is approaching the image forming apparatus by determining a relative position of the mobile terminal apparatus with respect to another mobile terminal apparatus at a time point before the printing data is received and at a time point when the printing data is received; and outputting a printing result based on printing data for which an output instruction operation is performed by the user, from among a plurality of pieces of accumulated printing data, wherein the outputting outputs the printing result when the mobile terminal apparatus is determined to be approaching the image forming apparatus even when the another mobile terminal apparatus is within a predetermined adjacent range of the image forming apparatus, and wherein even in a case where the received printing data is printing data from the mobile terminal apparatus for which the distance detected by the detecting is within the preset range, when the determining determines that the mobile terminal apparatus is not approaching the image forming apparatus, the accumulating accumulates the printing data without causing the outputting to output the printing result based on the printing data.

* * * * *